No. 674,363. Patented May 21, 1901.
A. BRADY.
LIGHTING APPARATUS FOR VEHICLES.
(Application filed July 26, 1900.)
(No Model.) 2 Sheets—Sheet 2.
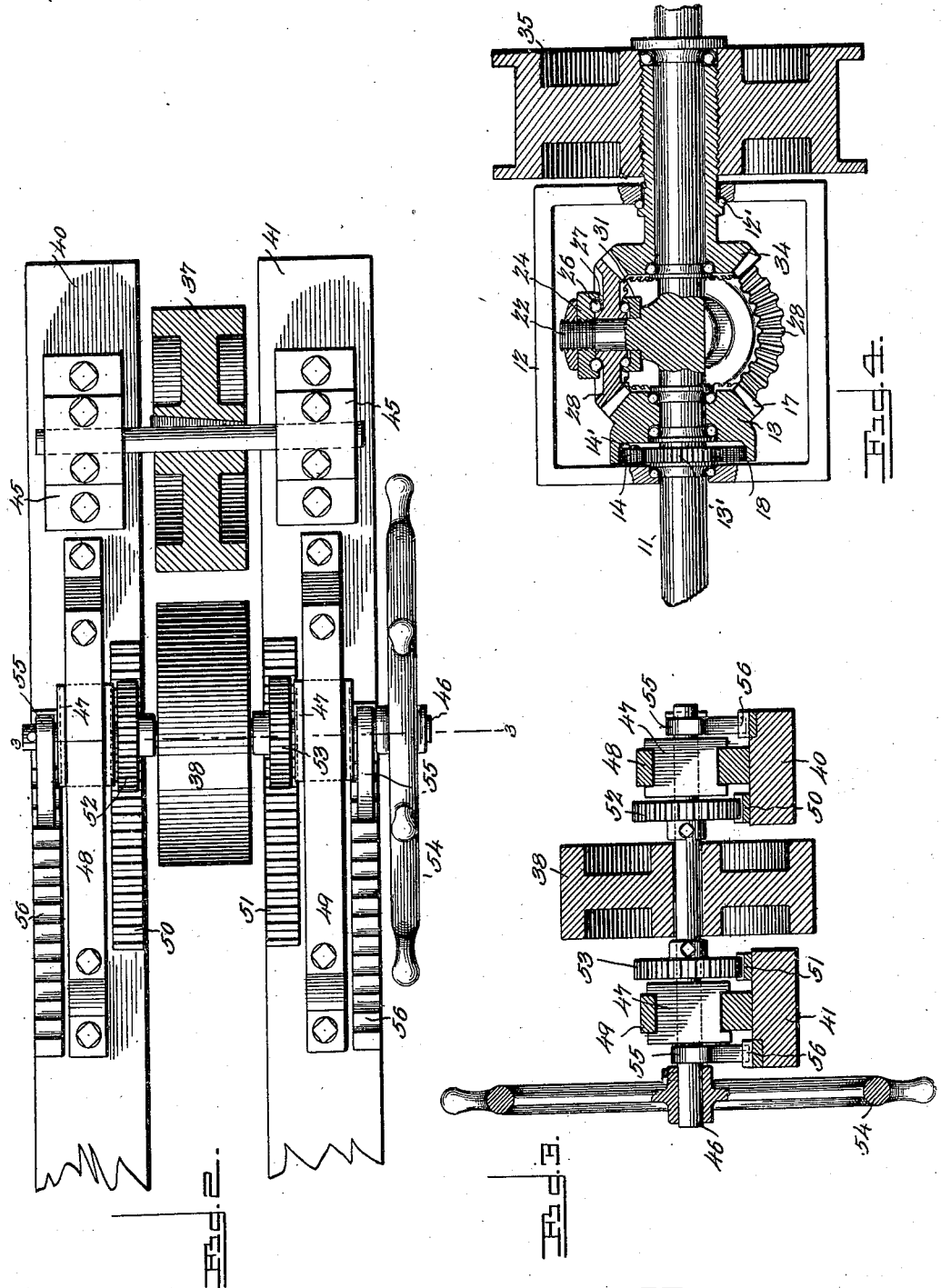

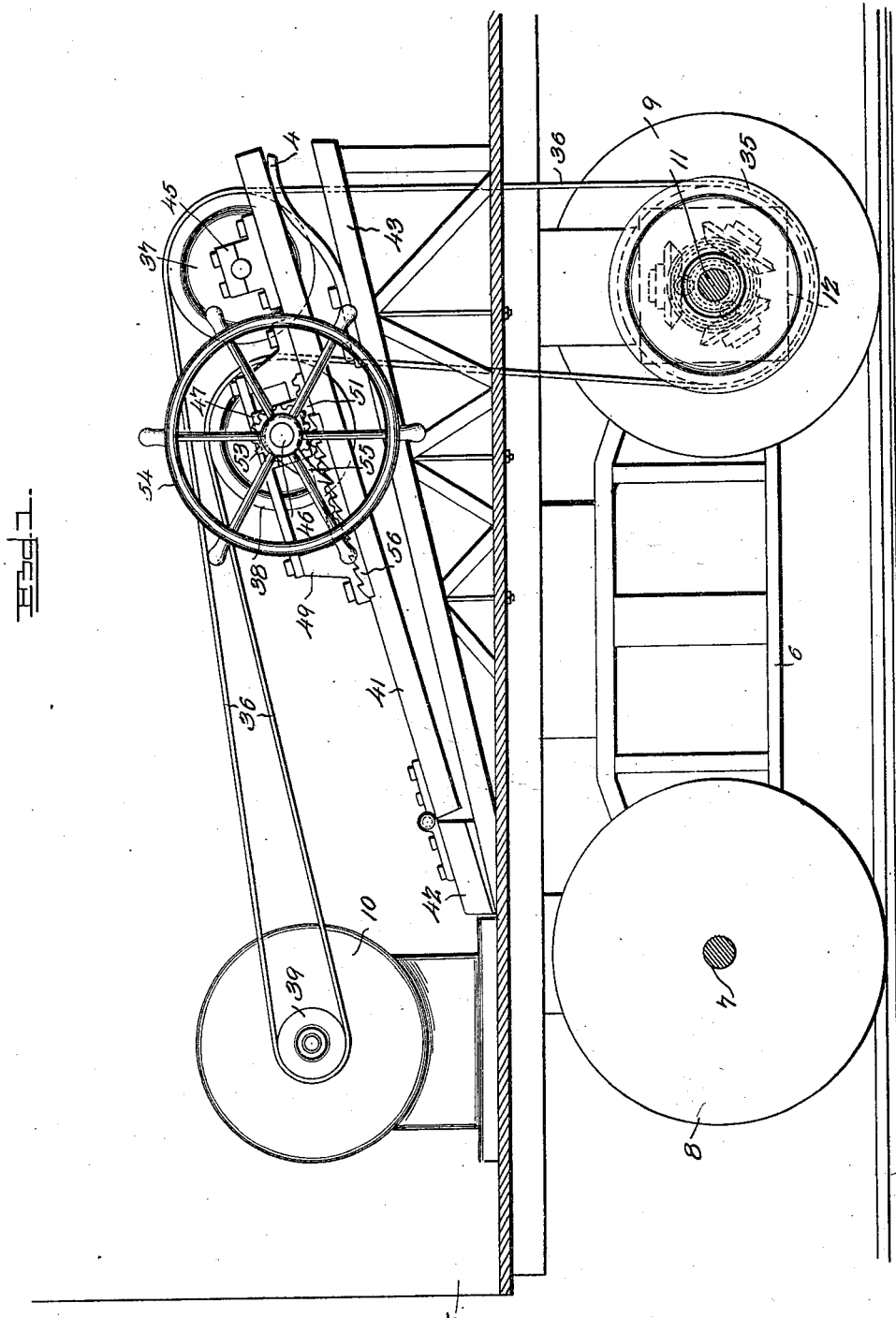

UNITED STATES PATENT OFFICE.

ALFORD BRADY, OF GALVESTON, TEXAS, ASSIGNOR OF THREE-FOURTHS TO GUS REYMERSHOFFER, M. ROSENBERGER, AND M. M. LEVY, OF SAME PLACE.

LIGHTING APPARATUS FOR VEHICLES.

SPECIFICATION forming part of Letters Patent No. 674,363, dated May 21, 1901.

Application filed July 26, 1900. Serial No. 24,943. (No model.)

*To all whom it may concern:*

Be it known that I, ALFORD BRADY, a citizen of the United States, residing at Galveston, in the county of Galveston and State of Texas, have invented a new and useful Lighting Apparatus for Vehicles, of which the following is a specification.

This invention relates to lighting apparatus for vehicles in general, and has particular reference to such apparatus as applied to cars, one object of the invention being to provide a construction by means of which energy may be drawn from the wheels of the car and supplied to a lighting-dynamo, further objects of the invention being evident from the following description and including the provision of means for maintaining proper tension of the belt which connects the car-wheels and the dynamo, and of means for multiplying the speed of the driving-pulley, which has geared connection with the axle of a pair of car-wheels.

In the drawings forming a portion of this specification, and in which like numerals of reference indicate similar parts in the several views, Figure 1 is a sectional view showing a portion of a car with the lighting-dynamo, the multiplying-gearing, and the belt tension shown in proper relation. Fig. 2 is a plan view of the belt-tightening mechanism. Fig. 3 is a section on line 3 3 of Fig. 2 with the cross-heads in elevation. Fig. 4 is a detail sectional view of the multiplying-gearing.

Referring now to the drawings, 5 represents a car which is supported upon a truck including a truck-frame 6, axles 7 and 11, and wheels 8 and 9, and in the car is located a dynamo 10 for supplying current to the lighting system of the car. The dynamo is driven from the axle 11 through the medium of a belt, hereinafter referred to and which is actuated from a multiplying-gearing driven by the axle 11, which latter is fixed to the wheels thereof in the usual or any other approved manner. The multiplying-gearing is inclosed in a casing 12 and comprises a gear 13, which is fixed to the axle 11 and with which mesh pinions 14, rotatably mounted upon stub-shafts 14', carried by the adjacent end of the casing 12. A second gear 13' is mounted loosely upon the axle 11 through the medium of ball-bearings 12', and one end of this gear or the body thereof is recessed, the inner periphery of the annular encircling wall of the recess having an internal gear 18 formed thereon and with which the pinions 14 mesh.

Within the inclosure of the casing 12 there are formed upon the axle 11 three equidistant stub-shafts 22, carrying race elements 24 adjacent their inner ends and with which coöperate balls 26 and race elements 27, of which the latter are carried by bevel-gears 28, mounted loosely upon the stub-shafts and which mesh with the bevel-gear 17 of the body 13', said gear 17 being at the inner end of the body opposite to the internal gear, as shown. These intermeshing gears 17 and 28 are of equal diameters, and thus if the shaft be rotated the gears 28 will be given a speed of rotation equal to twice the speed of the shaft multiplied by the ratio of gears 13 and 18. The gears 28 have additional race elements which coöperate with disks 31, carried by the stub-shafts 22, and intermediate which and their respective gears are disposed bearing-balls, as shown. A fourth bevel-gear 34 is engaged with the gears 28 and is mounted loosely upon the axle 11 through the medium of ball-bearings, as shown, the hub of this gear 34 being extended through the end of the casing 12 and having a belt-pulley 35 fixed to its exteriorly-projecting portion. Bearing-balls are disposed between the shaft or axle 11 and the casing at one end of the latter and also between the hub of the gear 34 and the casing at the opposite end thereof, as shown. The gear 34, and therewith the pulley 35, will move at twice the speed of axial rotation of gears 28.

The power-transmitting belt above referred to is shown at 36 and leads over direction-pulleys 37 and 38 to the pulley 39 upon the shaft of the dynamo.

To support the direction-pulleys, a frame is provided, and which frame comprises sills 40 and 41, disposed parallel and hinged at one end to blocks 42, supported on lower sills 43 of an inclined trestle which is fixed to the floor of the car 5, the sills 40 and 41 being disposed divergingly from the sills 43 and being held yieldably in such position by spring-fingers 44, which are attached to the sills 43 and are curved upwardly to rest with their ends against the under sides of the sills 40 and 41, thus holding the latter yieldably in their raised positions. The direction-pulley 37 is mounted in fixed bearings 45 upon the sills 40 and 41, while the shaft 46 of the pulley 38, and upon which said pulley is loosely mounted, is carried by cross-heads 47, mounted in slideways 48 and 49 upon the sills 40 and 41. Upon the sills 40 and 41 and between the slideways thereon are fixed racks 50 and 51, and with these racks mesh pinions 52 and 53, which are fixed on the shaft 46, so that if said shaft be rotated the pinions in engagement with the racks will feed the direction-pulley along the sills 40 and 41 toward and away from the dynamo to vary the tension of the belt which is engaged therewith, thus varying the friction between the belt and pulleys to an extent sufficient to drive the dynamo from the pulley 35 or to permit said pulley to rotate freely of the belt. The shaft 46 is rotated through the medium of a hand-wheel 54, and sliding movement of the cross-heads under the influence of the pull of the belt is prevented by reason of a pivoted pawl 55, mounted at each end of the shaft 46, and which pawls engage ratchets 56 upon sills 40 and 41. When the pawls are lifted from the ratchets, the shaft may be shifted in the direction of the dynamo to lessen the tension of the belt; but when the pawls are in engagement movement of the shaft in the opposite direction is permissible.

With this construction it will be seen that the dynamo may be driven at a high rate of speed and that it may be started and stopped at will, and, furthermore, by reason of the yieldable support of the sills 40 and 41 the latter may be drawn downwardly when the tension of the belt is increased by pivotal movement of the truck and consequent lateral swinging of the axle 11.

It will be understood that in practice various modifications of the specific construction shown may be made and that any suitable materials and proportions may be used for the various parts without departing from the spirit of the invention.

What is claimed is—

1. The combination with a rotatable driving member and a rotatable driven member, of a belt connecting them, pivotally-mounted sills, a direction-pulley for the belt having fixed relation to the sills, and a second direction-pulley mounted upon the sills for bodily movement with respect thereto, the second pulley having means for shifting it and means for holding it at different points of its shifting movement.

2. The combination with a driven member and a driving member bodily movable with respect to the driven member, of a belt connecting said members, yieldably-mounted sills, a direction-pulley for the belt mounted upon the sills in fixed relation thereto, a second direction-pulley mounted for bodily movement upon the sills, means for shifting the second direction-pulley to vary the tension of the belt, and means for holding the second direction-pulley against shifting movement.

3. The combination with a driven member and a driving member bodily movable with respect to the driven member, of a belt connecting said members, fixed sills, movable sills hinged to the fixed sills and diverging therefrom, spring-fingers upon the fixed sills and disposed to hold the movable sills yieldably in their divergent positions, a direction-pulley for the belt mounted upon and having fixed relation to the yieldable sills, guideways upon the yieldable sills, cross-heads in the guideways, a shaft mounted in the cross-heads and having a direction-pulley mounted loosely thereon and in engagement with the belt, pinions fixed upon the shaft, racks upon the sills and with which the pinions are engaged, means for rotating the shaft to shift the pulley bodily, fixed ratchets, and pawls movable with the shaft and disposed in cooperative relation to the racks to hold the cross-heads and therewith the pulley at different points of its bodily movement.

In testimony that I claim the foregoing as my own I have hereto affixed my signature in the presence of two witnesses.

ALFORD BRADY.

Witnesses:
I. LOVENBERG, Jr.,
MARCELL A. MEYER.